(12) United States Patent
Hiramatsu

(10) Patent No.: US 7,631,831 B2
(45) Date of Patent: Dec. 15, 2009

(54) SEAT BELT RETRACTOR

(75) Inventor: Koji Hiramatsu, Tokyo (JP)

(73) Assignee: Takata Corporation, Tokyo (JP)

( * ) Notice: Subject to any disclaimer, the term of this patent is extended or adjusted under 35 U.S.C. 154(b) by 102 days.

(21) Appl. No.: 11/797,576

(22) Filed: May 4, 2007

(65) Prior Publication Data

US 2007/0262186 A1 Nov. 15, 2007

(30) Foreign Application Priority Data

May 10, 2006 (JP) .............................. 2006-131034

(51) Int. Cl.
  *B60R 22/34* (2006.01)
(52) U.S. Cl. ...................... 242/374; 280/807
(58) Field of Classification Search .................. 242/374; 60/632
  See application file for complete search history.

(56) References Cited

U.S. PATENT DOCUMENTS

| | | | |
|---|---|---|---|
| 5,881,962 A * | 3/1999 | Schmidt et al. ............ | 242/374 |
| 6,152,391 A | 11/2000 | Nagata et al. | |
| 6,345,504 B1 * | 2/2002 | Takehara et al. ............. | 60/638 |
| 6,354,528 B1 | 3/2002 | Nagata et al. | |
| 6,532,739 B2 * | 3/2003 | Kameyoshi et al. .......... | 60/638 |
| 6,663,037 B2 | 12/2003 | Matsumura | |
| 6,669,131 B2 * | 12/2003 | Takehara et al. ............. | 242/374 |
| 6,722,600 B2 * | 4/2004 | Hamaue et al. ............. | 242/374 |
| 2001/0040199 A1 * | 11/2001 | Takehara et al. ............. | 242/374 |
| 2002/0000487 A1 | 1/2002 | Hamaue et al. | |
| 2006/0237569 A1 * | 10/2006 | Kosugi et al. ............... | 242/374 |

FOREIGN PATENT DOCUMENTS

JP 2005-306111 A 11/2005
WO WO 2005/080150 A1 9/2005

* cited by examiner

*Primary Examiner*—Sang Kim
(74) *Attorney, Agent, or Firm*—Foley & Lardner LLP

(57) ABSTRACT

A seat belt device is provided where a pretensioner moves a ball train to the distal end side of a ball guide pipe by means of gas discharged from a gas generating device, and the movement rotates the spool for winding the seat belt in a belt winding direction so as to eliminate slack of the seat belt, while imparting necessary tension to the seat belt by loading rotational resistance on the spool in a belt withdrawing direction with gas pressure exerted on the ball train. The ball stopper stops movement of the ball train before all the balls in the ball train are ejected from the ball guide pipe in a state where the ball train functions to rotate the spool in the belt winding direction.

27 Claims, 6 Drawing Sheets

SEAT BELT RETRACTOR

FIELD OF INVENTION

The present invention relates to a seat belt retractor included in a seat belt device and, more particularly, to a seat belt retractor with a pretensioner for increasing restraint of a seat belt when a seat belt device performs a restraining operation.

BACKGROUND

Seat belt devices are indispensable devices for seats used for rapidly moving vehicles, or the like, in order to restrain occupants (wearing seat belts) from rapid movement due to sudden acceleration that occurs in the event of vehicle collision. Such seat belt devices consist of a seat belt, a seat belt retractor and a buckle as main components, wherein the seat belt retractor is a principal mechanism component.

The seat belt retractor has a winding device called a spool and is adapted to contain the seat belt as it pulls and winds the seat belt onto the spool by means of a spring force. In order for an occupant to wear the seat belt, the occupant withdraws the seat belt from the seat belt retractor by pulling a tongue plate attached to the seat belt and engaging the tongue plate with a buckle mounted on one side of the seat, thus giving the state where the occupant M is restrained by the seat belt.

In recent years, these seat belt retractors have generally been provided with pretensioners for further increasing the restraint imparted to occupants. When restraining operation of the seat belt devices is required, the pretensioners remove slack of the worn seat belts to give a proper restraining state while imparting tension to the seat belts so as to maintain the restraining state, thus increasing the restraint imparted to the occupants.

Some types of mechanism are known for removing slack and generating tension in a pretensioner. A typical example of such a mechanism is disclosed in Japanese patent application publication No. 2005-306111 ("hereinafter, called the "ball-type application").

The ball-type pretensioner removes slack of the seat belt by rotating a spool by means of the ball train being moved by gas discharged from a gas generating device, while giving a predetermined tensile state of the seat belt by means of the gas pressure on the ball train imparting resistance on the spool against belt withdrawal for maintaining a restraining state where slack is removed.

More specifically, the ball-type pretensioner includes a ball guide pipe that contains a plurality of balls so as to form a ball train provided with a piston component at its proximal end, and a gas generating device is connected to the proximal portion of the ball guide pipe. The gas generating device ignites to discharge high-pressure gas when an acceleration sensor detects acceleration equal to or larger than a predetermined value. Subsequently, the gas pressure is transmitted through the piston component to the ball train, causing the ball train to move inside the ball guide pipe. This movement of the ball train is then transmitted to the spool to drive the spool to rotate while imparting predetermined resistance on the spool against belt withdrawal by the gas pressure exerted on the ball train.

The mechanism for transmitting, to the spool, movement of the ball train and gas pressure on the ball train is, for example, formed of a combination of ring gear and pinion gear. Specifically, the ring gear includes external teeth that are formed on the outer periphery of the ring gear for transmitting movement of the ball train and gas pressure on the ball train through engagement of the moving ball train, and internal teeth that are formed on the inner periphery of the ring gear for engaging with the pinion gear. As the ball train starts moving, the ring gear engages with the pinion gear and rotates, with the result that the pinion gear rotates. The rotation of pinion gear is transmitted to the spool so that the spool rotates in the direction in which the spool winds the seat belt. The amount of rotation by which the spool winds depends on the degree of slack of the seat belt at that point in time. When the belt slack has been removed so as to give a proper restraining state, the spool stops its rotation and maintains a state where predetermined resistance is imparted against belt withdrawal by gas pressure on the ball train.

The above described ball-type pretensioner is advantageous in that it effectively performs functions desired for pretensioners. However, there still remains room for further improvement in its function. Specifically, the above-described ball-type pretensioner has a problem associated with removal of slack of the seat belt.

The amount of rotation by which the spool winds when the pretensioner removes belt slack, as described above, depends on the degree of slack of the seat belt at that point in time. When the degree of slack exceeds a normal range, all the balls of the ball train inside the ball guide pipe may be used. As a result, there is a possibility that transmission of gas pressure through the balls to the spool is disabled, that is, the application of tension to the seat belt for restraint is disabled. Slack of the seat belt is related to the type of clothes that an occupant is wearing. In other words, if the occupant is wearing thick clothes, as a result, larger belt slack must be removed due to the clothes. In such a case, excessive belt slack tends to occur.

Accordingly, there is a need for a pretensioner capable of applying tension to a to seat belt to restrain an occupant when the seat belt is exhibiting excessive slack.

SUMMARY

According to one embodiment, a seat belt retractor, includes a spool for winding and holding a seat belt thereon and a pretensioner including a ball guide pipe that aligns a plurality of balls to form a ball train, a gas generator for generating gas discharged to move the ball train toward a distal end of the ball guide pipe, wherein the spool is rotated in a belt winding direction due to the movement of the ball train, whereby tension is imparted to the seat belt and a ball train movement stopper, capable of stopping the movement of the ball train in the ball guide pipe.

According to another embodiment, the ball train movement stopper stops the movement of the ball train before all the balls of the ball train are ejected from the ball guide pipe.

According to yet another embodiment, the pretensioner includes a motion converting device that converts the movement of the ball train into rotational movement, and wherein the ball train movement stopper includes a ball stopper that is arranged in the ball train so as to be movable in the ball guide pipe and that stops the ball train by contacting a motion converting device.

According to still another embodiment, the motion converting device includes a ring gear having on its outer periphery external teeth with which the balls engage in a state where the balls are moving, and wherein the ball stopper is formed to have a shape and size so as to block the movement of the ball train by contacting the outer periphery of the ring gear.

According to another embodiment, a seat belt device, includes a seat belt, an anchor for connecting the seat belt to a vehicle body, a tongue attached to the seatbelt, configured to engage a buckle and a seat belt retractor, attached to the seat belt, further comprising a spool for winding and holding a seat belt thereon and a pretensioner including a ball guide pipe that aligns a plurality of balls to form a ball train, a gas generator for generating gas discharged to move the ball train toward a distal end of the ball guide pipe, wherein the spool is rotated in a belt winding direction due to the movement of the ball train, whereby tension is imparted to the seat belt and a ball train movement stopper, capable of stopping the movement of the ball train in the ball guide pipe.

It is to be understood that both the foregoing general description and the following detailed description are exemplary and explanatory only, and are not restrictive of the invention as claimed.

BRIEF DESCRIPTION OF THE DRAWINGS

Features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

To achieve the aforementioned object, the present invention provides a seat belt retractor comprising: a spool for winding and holding a seat belt thereon; and a pretensioner including: a ball guide pipe that aligns a plurality of balls to form a ball train; and a gas generator for generating gas discharged to move the ball train toward a distal end of the ball guide pipe, wherein the spool is rotated in a belt winding direction due to the movement of the ball train, whereby tension is imparted to the seat belt, the seat belt retractor being characterized in that the pretensioner includes a ball train movement stopper that is capable of stopping the movement of the ball train in the ball guide pipe. In particular, the ball train movement stopper is preferably configured to stop the movement of the ball train before all the balls of the ball train are ejected from the ball guide pipe in a state where the ball train functions to drive the spool to rotate in the belt winding direction.

Provided with the ball train movement stopper, even with excessive slack, a proper number of balls may reliably remain inside the ball guide pipe, and the residual balls may maintain gas pressure in the ball guide pipe. Thus, regardless of the degree of slack of the seat belt, sufficient tension may be imparted to the seat belt at the time of the restraining operation.

Furthermore, the ball train movement stopper is preferably configured to include a ball stopper that is arranged in the ball train and that stops the ball train by contacting a motion converting device which converts movement of the ball train into rotation. Forming the ball train movement stopper with the ball stopper results in a more simpler structure for providing a function for stopping movement of the ball train in the pretensioner.

In addition, the motion converting device may be formed of a ring gear having, on its outer periphery, external teeth, with which the balls engage while moving, and the ball stopper may be formed into a shape and size so as to be movable in the ball guide pipe, while it blocks the movement of the ball train upon contacting the outer periphery of the ring gear.

According to the above described present invention, the ball train movement stopper, where necessary, may stop movement of the ball train in the pretensioner, and it may enable a ball-type pretensioner to impart sufficient tension to a seat belt in use for highly secure restraint of a pretension-type even with excessive slack of the seat belt at the time of the operation of the pretensioner and, therefore, further improve the function of the pretension-type seat belt retractor.

Figure 1:
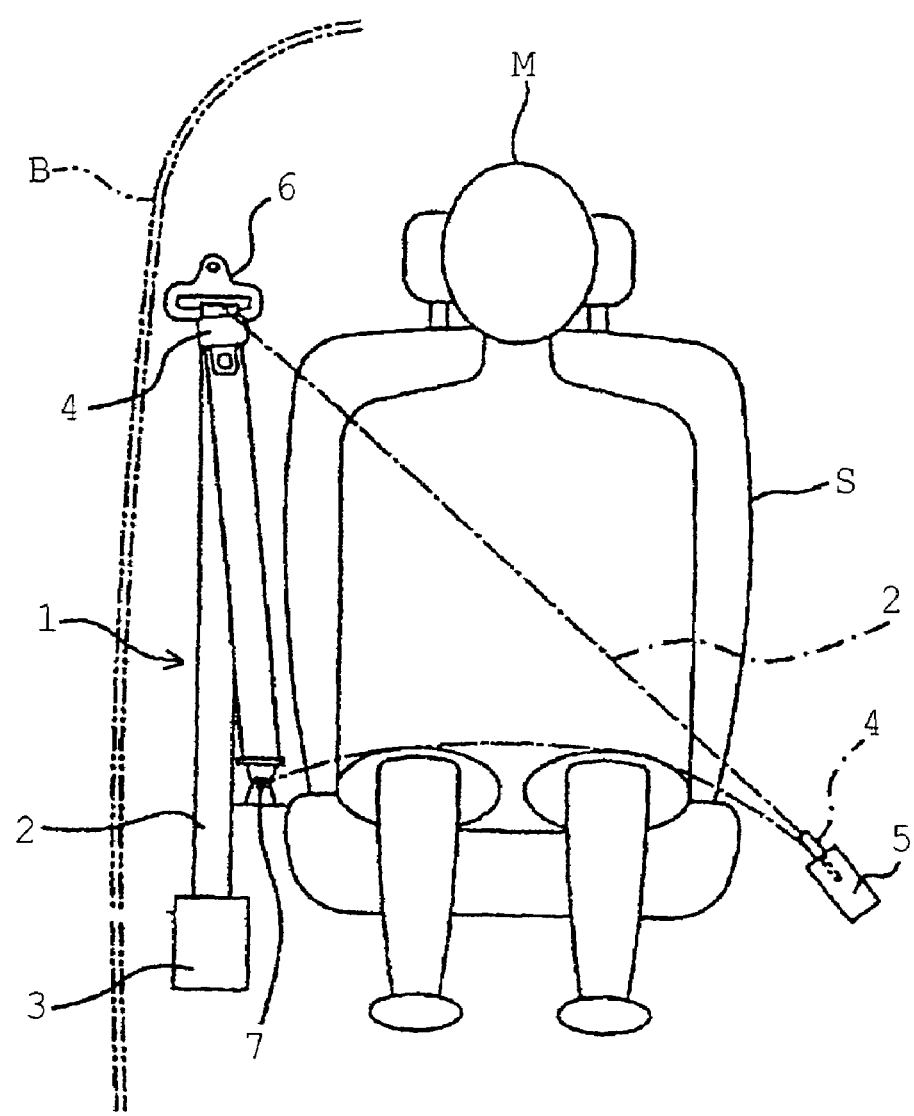
FIG. 1 is an example of the whole structure of a seat belt device provided with a seat belt retractor, according to one embodiment.

According to one embodiment, FIG. 1 shows an example of the whole structure of a seat belt device provided with a seat belt retractor. The seat belt device 1 in this example is used in conjunction with a vehicle seat S and used for restraining a vehicle occupant M in the seat S, and includes a seat belt 2, a seat belt retractor 3, a tongue 4, a buckle 5, a shoulder anchor 6 and an anchor 7.

The seat belt 2 may be wound at one end by the seat belt retractor 3, pivotally connected at the other end by the anchor 7 to a vehicle body B, and have its middle portion passed through the shoulder anchor 6. In order for the occupant M to wear the seat belt 2, the occupant M withdraws the seat belt 2 from the seat belt retractor 3 by the tongue 4 slidably fitted to the seat belt 2 and then engages the tongue 4 with the buckle 5, thus giving a state where the occupant M is restrained by the seat belt 2.

Figure 2:
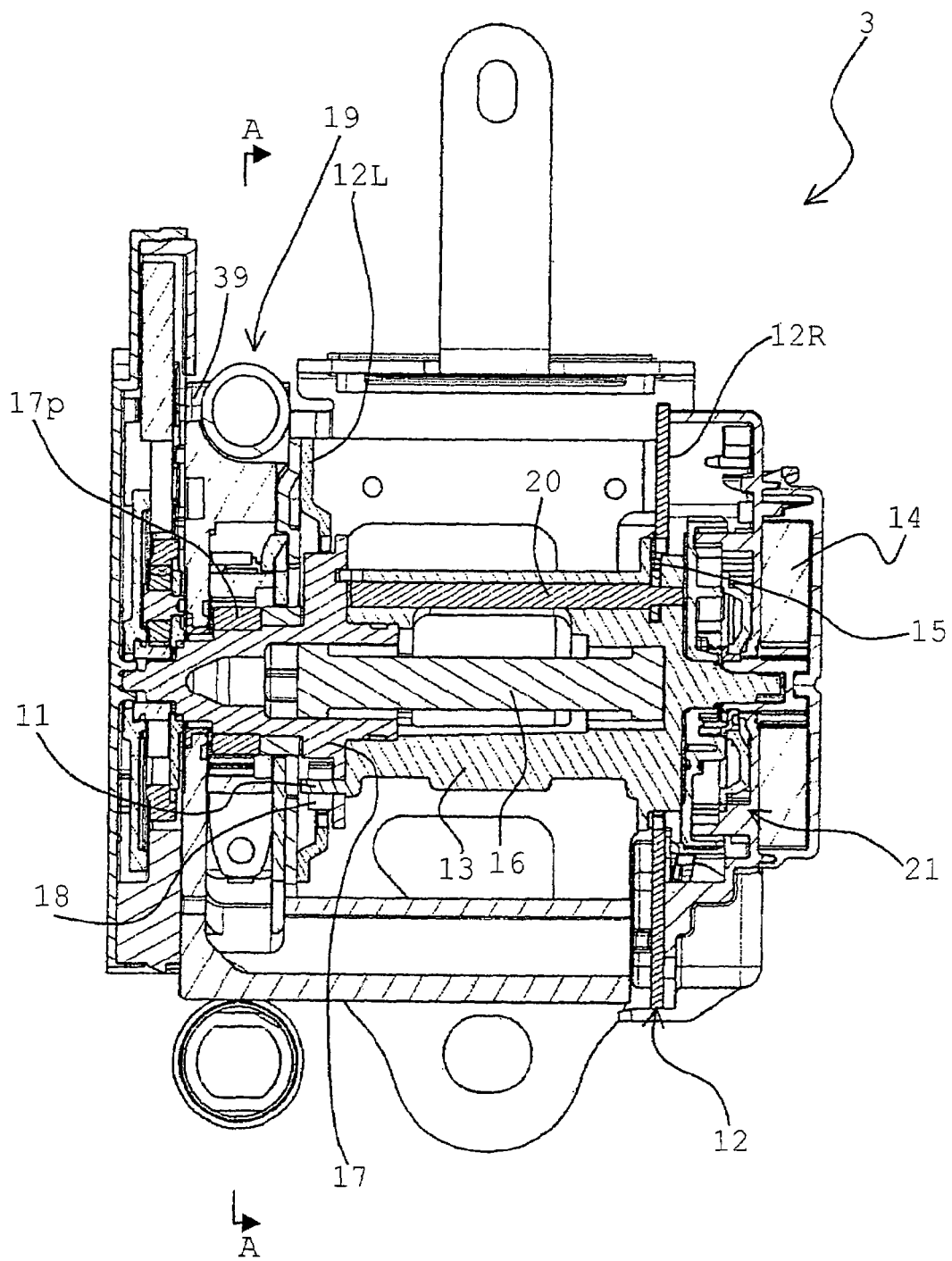
FIG. 2 is a longitudinal cross-sectional view schematically showing the whole structure of the seat belt retractor, according to one embodiment.

A seat belt device such as the seat belt device 1 has the seat belt retractor 3 as its main component. FIG. 2 shows the structure of the seat belt retractor 3 according to one embodiment. FIG. 2 schematically shows a longitudinal cross-sectional view of the whole structure of the seat belt retractor 3.

As shown in FIG. 2, the seat belt retractor 3 is formed so that a spool 13, a rotation urging spring (spiral spring) 14, a spool pawl 15, a torsion bar 16, a locking base 17, a locking base pawl 18, a pretensioner 19, a cam shaft 20, a locking activation mechanism 21 and an acceleration detector (not shown) are assembled as main components into a substantially box-shaped frame 12 formed of right and left side walls 12L, 12R and a back wall and the like (not shown).

The spool 13 is a winding device that winds the seat belt 2 shown in FIG. 1 (not shown in FIG. 2) and holds it in the seat belt retractor 3, having a drum shape as a whole. The rotation urging spring 14 continuously exerts a rotational urging force on the spool 13, and rotation caused by the rotation urging force enables the spool 13 to pull the seat belt 2 and wind it thereon.

According to one embodiment, the spool pawl 15 is a spool locking device that locks rotation of the spool 13 in the belt withdrawing direction so as to block withdrawal of the seat belt 2 and, where appropriate, locks rotation of the spool 13 in the belt withdrawing direction using the principle of a ratchet mechanism. Specifically, the spool pawl 15 is formed into a pawl shape in the ratchet mechanism and is pivotable in a direction perpendicular to the axis of the spool 13 at the end face portion of the spool 13. That is, the spool pawl 15 is mounted pivotally toward the radially outer side and radially inner side of the spool 13. As the spool pawl 15 is pivoted toward the radially outer side to engage with a meshing teeth (not shown) formed on the frame 12, the spool 13 is made to enter a rotation lock state (a state where rotation in the belt withdrawing direction is locked). According to one embodiment, the rotation locking of the spool 13 by the spool pawl 15 is performed when the acceleration detector detects that the seat belt 2 is being withdrawn at an acceleration equal to or larger than a predetermined value. Specifically, when the acceleration detector detects an acceleration equal to or larger than a predetermined value on the withdrawal of the seat belt 2, in response, the locking activation mechanism 21 is activated to pivot the spool pawl 15 radially outward to engage with the meshing teeth formed on the frame 12, thereby performing the rotation locking.

The torsion bar 16 forms a substantial part of an EA (Energy Absorption) mechanism for reducing impact exerted on the occupant through the seat belt 3 in the event of a vehicle collision. Specifically, the torsion bar 16 is connected at one end to the spool 13 and connected at the other end to the locking base 17. The connection to the spool 13 is made rotatable in a certain range relative to the spool 13, while the connection to the locking base 17 is made fixed. When the occupant is rapidly moved forward due to a vehicle collision and the seat belt 2 is rapidly withdrawn, the torsion bar 16 releases the rotation lock state due to the withdrawal of the seat belt 2, which will be described later, and receives torque of the spool 13 being rotated in the belt withdrawing direction so as to be torsionally deformed. This torsional deformation absorbs the energy of movement of the occupant so as to reduce the impact exerted on the occupant. It should be noted that at the time of the torsional deformation of the torsion bar 16, the connection of the torsion bar 16 to the locking base 17 is in a fixed state because the locking base 17 is in a rotation lock state.

The locking base 17 is connected to the spool 13 through the torsion bar 16. The connection between the locking base 17 and the torsion bar 16 is made fixed. Thus, the locking base 17 may be rotated relative to the spool 13 in the same range of relative rotation between the spool 13 and the torsion bar 16. The locking base 17 has a rotation lock releasing function for releasing a rotation lock state of the spool 13 in response to the operation of the pretensioner 19, which will be described later, a torsion bar fixing function for fixing the torsion bar 16 at the other end thereof at the time when torsional deformation occurs, and a pretensioner torque transmitting function for transmitting torque generated by the pretensioner 19 to the spool 13. For these functions, a pinion gear 17p is assembled.

The locking base pawl 18 is a locking base lock device that locks rotation of the locking base 17 so as to fix the other end of the torsion bar 16 (the end connected to the locking base 17) and, as in the case of the spool pawl 15, is formed into a pawl shape in the ratchet mechanism. The locking base pawl 18 is connected to the locking base 17 so as to be pivotable radially outward and radially inward of the locking base 17. As the locking base pawl 18 is pivoted radially outward to engage with a meshing teeth (not shown) formed on the frame 12, the locking base 17 is made to enter a rotation lock state in the same rotating direction as the belt withdrawing direction of the spool 13. The rotation locking of the locking base 17 by the locking base pawl 18 is performed due to actuation of the pretensioner 19, which will be described later.

According to one embodiment, when a restraining operation is required for the occupant M by the seat belt device 1, the pretensioner 19 removes slack of the worn seat belt 2 to give a proper restraining state while imparting a predetermined tension to the seat belt 2 for maintaining the restraining state, thus increasing restraint on the occupant M. The pretensioner 19 will be described in detail later.

The cam shaft 20 is a component that transmits, to the spool pawl 15, motion for releasing rotation locking of the spool 13 that is locked through the locking base 17. The cam shaft 20 is connected at one end to the pivot shaft (not shown) of the spool pawl 15 through a cam component and engaged at the other end with a cam component guide groove (not shown) formed on the locking base 17 through a cam component.

The locking activation mechanism 21 functions to start rotation locking of the spool 13 by the spool pawl 15. Specifically, the locking activation mechanism 21 is activated when the acceleration detector detects acceleration equal to or larger than a predetermined value during withdrawal of the seat belt 2 and due to the activation, the spool pawl 15 is engaged with a meshing teeth to obtain rotation locking of the spool 13.

Figure 3:
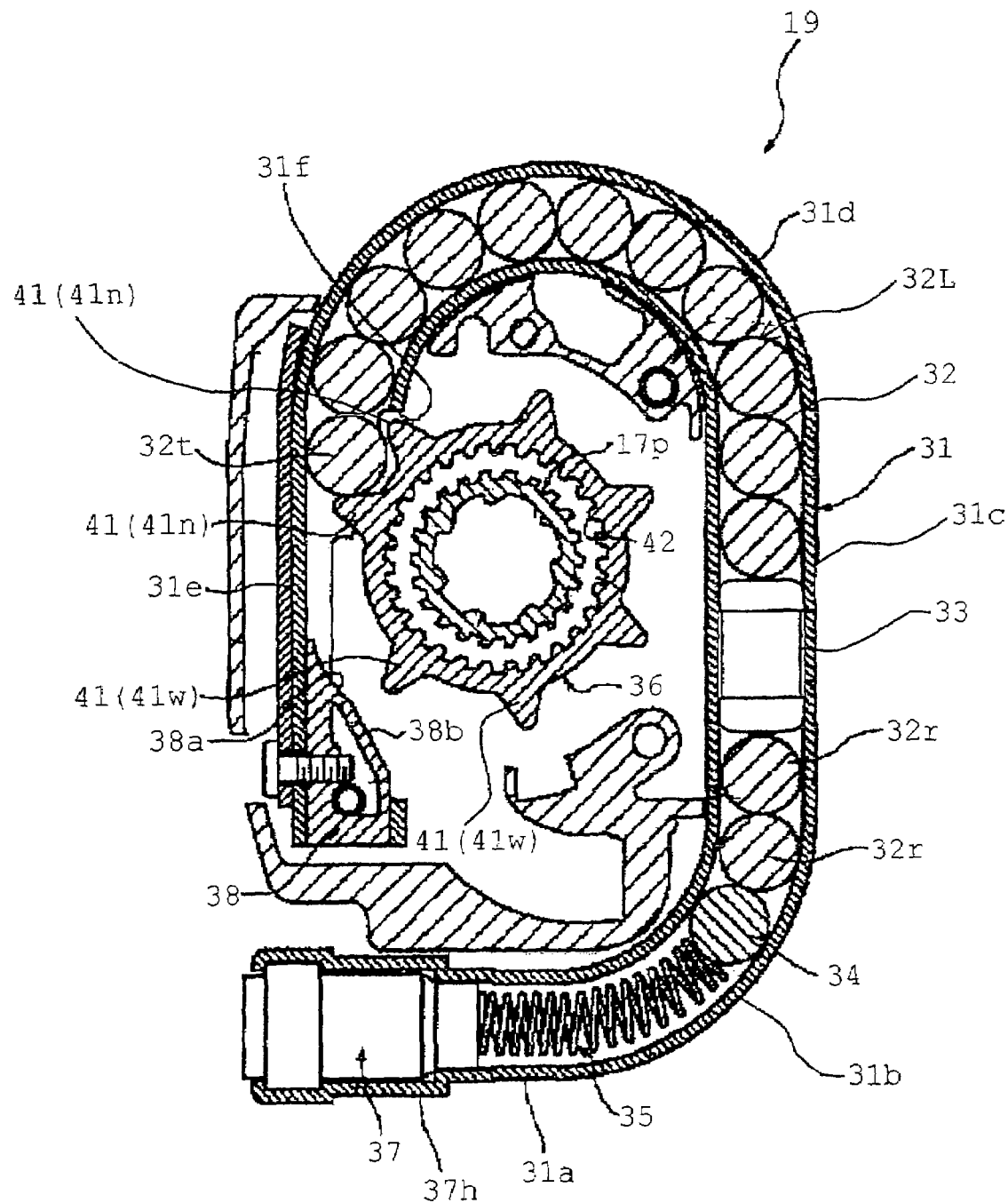
FIG. 3 is a cross-sectional view of the structure of a pretensioner, taken along the line A-A in FIG. 2, according to one embodiment.
Figure 4:
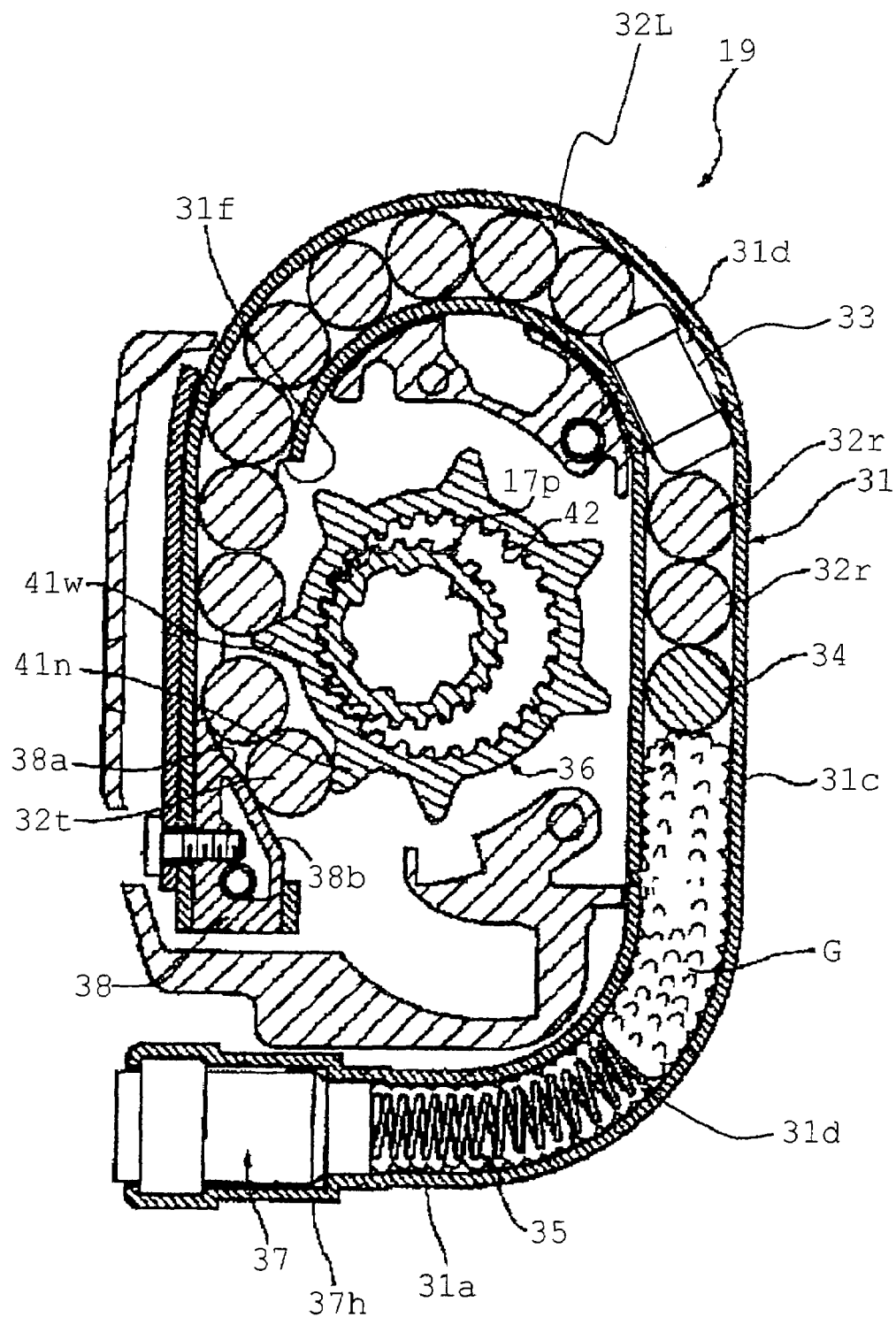
FIG. 4 is a view showing the pretensioner in one state of being actuated, according to one embodiment.

Hereinafter, the pretensioner 19 will be described in detail. According to one embodiment, FIG. 3 shows a cross-sectional view of the structure of the pretensioner 19 taken along the line A-A in FIG. 2. FIG. 4 shows a state of its operation according to one embodiment. As shown in FIG. 3, the pretensioner 19 includes, as main components, a ball guide pipe 31, balls 32, a ball stopper 33, a piston ball 34, a coil spring 35, a ring gear 36, a gas generator 37, and a guide block 38. Note that the ball stopper 33 is shown in a non-cross-sectional manner in the drawing.

The ball guide pipe 31 is a guiding device for guiding movement of the balls 32, or gas pressure transmitting components, for transmitting gas pressure. The ball guide pipe 31 is, for example, formed by bending a steel pipe, including a proximal portion 31a that is formed linearly, a curved portion 31b that is curved at 90 degrees from the distal end of the proximal portion 31a, an intermediate straight portion 31c that is formed linearly and perpendicularly to the proximal portion 31a from the distal end of the curved portion 31b, a semi-circular portion 31d that is curved semi-circularly from the distal end of the intermediate straight portion 31c, and a distal straight portion 31e that is formed linearly from the distal end of the semi-circular portion 31d. The distal straight portion 31e has a cutout 31f formed therein. This ball guide pipe 31 is secured to the frame 12 so as to be held between the side wall 12L of the frame 12 of the seat belt retractor 3 and the pretensioner cover 39, as shown in FIG. 2.

Each of the balls 32 is, for example, formed into a sphere having high rigidity, made of metal material, and functions to transmit pressure of gas discharged from the gas generator 37 to the ring gear 36 so as to drive the ring gear 36 to rotate. A plurality of the balls 32 are closely arranged in series to fill the inside of the ball guide pipe 31 from the intermediate straight portion 31c to the cutout 31f of the distal straight portion 31e so as to form a ball train 32L. The ball train 32L moves toward the distal end side of the ball guide pipe 31 as a result of receiving pressure of gas discharged from the gas generator 37. This movement of the ball train 32L rotates the spool 13 in the belt winding direction, thereby removing slack of the seat belt 2. Thus, the ball train 32L, or the balls 32, functions as a gas pressure transmitting device at the time of the restraining operation.

The ball stopper 33 is a ball train movement stopper for forcing the ball train 32L to stop its movement. This ball stopper 33 is made of metal material or synthetic resin material and arranged in the ball train 32L at a position where one, two or more residual balls 32r (two in the drawing) remain on the proximal portion side in the ball train 32L. Up until all the balls 32 of the ball train 32L have been used to drive the spool 13 to rotate in the belt winding direction through rotation of the ring gear 36, that is, before all balls 32 of the ball train 32L are ejected from the ball guide pipe 31 in accordance with their movement due to transmission of gas pressure, the ball stopper 33 functions to block and force the ball train 32L to stop its movement so that the residual balls 32r remain in the ball guide pipe 31.

For the above purpose, the ball stopper 33 is formed into a predetermined shape and size. The shape and size are designed to fulfill the requirements that the ball stopper 33 may move inside the ball guide pipe 31 together with the ball train 32L and also may block movement of the ball train 32L in such a manner that it cannot be caught by the rotation of the ring gear 36 when contacting one of the external teeth 41 on the outer periphery of the ring gear 36 to thereby stop the residual balls 32r of the ball train 32L. According to one embodiment, the ball stopper 33 in the example shown in the drawing is formed into a bale shape or cylindrical shape with rounded edges, having a longitudinal length of approximately one and half times to twice the diameter of the ball 32 and a width approximately the same as the diameter of the ball 32. The shape and size of the ball stopper 33 are not limited to the above-mentioned examples. The shape may be appropriately selected from shapes that fulfill the above requirements, such as a dumbbell shape and a drum shape.

According to one embodiment, the piston ball 34 is a piston component that is arranged in the ball guide pipe 31 so as to be in contact with the proximal end of the ball train 32L. The piston ball 34 functions to transmit pressure of gas discharged from the gas generator 37 to the ball train 32L, while functioning as a seal to prevent the discharged gas from leaking beyond the piston ball 34. For this purpose, the piston ball 34 is, for example, made of an elastic and highly heat-resistant material, such as silicone rubber. The piston ball 34 may be elastically deformed when receiving gas pressure, so that it closely contacts the inner peripheral surface of the ball guide pipe 31 so as to perform sealing.

The coil spring 35 is an urging device that normally presses and urges the ball train 32L in its moving direction. The coil spring 35 is arranged in the ball guide pipe 31, extending from the proximal end 31a to the middle of the curved portion 31b so as to be pressed against and in contact with the piston ball 34.

According to one embodiment, the ring gear 36 is formed into a ring shape, having the external teeth 41 formed on its outer peripheral surface and internal teeth 42 formed on its inner peripheral surface. The external teeth 41 include wide pitch external teeth 41w and narrow pitch external teeth 41n. A plurality of pairs of the wide pitch external teeth 41w are provided with a pitch that allows engagement of two balls 32. A single pair of the narrow pitch external teeth 41n is provided with a pitch that allows engagement of only one ball 32. On the other hand, the internal teeth 42 are formed to be engageable with the pinion gear 17p of the locking base 17 shown in FIG. 2. The ring gear 36 is held at a specified position by a plurality of shear pins (not shown) that extend from the pretensioner cover 39 and at the specified position, a pair of the narrow pitch external teeth 41n, 41n penetrates through the cutout 31f of the ball guide pipe 31 thereinto 36. The ring gear 36 is not engaged with the pinion gear 17p in this state. A ring gear such as the ring gear 36 functions as a motion converting device that converts movement of the ball train 32L that has received gas pressure into rotational movement.

According to one embodiment, the gas generator 37 is a gas generating device that is contained in a gas generator container 37h connected to the proximal end of the ball guide pipe 31 so as to be capable of discharging high-pressure gas into the ball guide pipe 31, where appropriate.

According to one embodiment, the guide block 38 is secured at the distal end of the distal straight portion 31e to the ball guide pipe 31. The guide block 38 functions to guide the balls 32 to engage with the external teeth 41 of the ring gear 36 in order to transmit their movement to the ring gear 36 and also functions to guide the balls 32 that have completed transmission of their movement to be ejected toward a ball reservoir (not shown). Therefore, the guide block 38 is formed into cylindrical body having substantially the same thickness as the ball guide pipe 31 for the purpose of guiding the balls 32, the cylindrical body including a first guide face 38a and a second guide face 38b provided in an oblique manner. The first guide face 38a, described later, is formed to extend downward from the upper end portion of the guide block 38 so as to have a circular arc shape substantially concentrical to the ring gear 36 being engaged with the pinion gear 17p. At the actuation of the pretensioner 19, the first guide face 38a guides the balls 32 to engage with the external teeth 41 of the ring gear 36 through the cutout 3 If at the distal straight portion 31e of the ball guide pipe 31 so as to transmit the movement to the ring gear 36 (see FIG. 4). On the other hand, the second guide face 38b is formed into planar shape that gradually recedes away from the ring gear 36. The second guide face 38b guides the balls 32 that have completed transmission of their movement to be ejected toward the ball reservoir.

Hereinafter, the operation of the pretensioner 19 will be described according to one embodiment. The pretensioner 19 is in a state shown in FIG. 3 before actuation. In other words, the ball train 32L is pressed and urged by the coil spring 35 to thereby make the front-most ball 32t of the ball train 32L become slightly pressed against and in contact with a pair of the narrow pitch external teeth 41n, 41n that penetrates through the cutout 31f at the above described specified position. In this state, since the ring gear 36 and the pinion gear 17p are not engaged with each other as described above, the pretensioner 19 and the locking base 17 are separated and the locking base 17 may freely rotate without any effect from the pretensioner 19.

In the above situation, when acceleration equal to or larger than a predetermined value is detected, an activation signal is input to the gas generator 37 to thereby ignite to discharge high-pressure gas G into the ball guide pipe 31, as shown in FIG. 4. The pressure of the discharged gas G is exerted through the piston ball 34 on the ball train 32L and subsequently is exerted through the front-most ball 32t (the ball 32t in the state shown in FIG. 3) on the ring gear 36. As a result, the shear pins holding the ring gear 36 at the specified position are sheared to release its holding force and the gas pressure transmitted through the ball 32t then displaces the ring gear 36 so that the ring gear 36 engages with the pinion gear 17p, thus giving a clutch engagement state.

Once having the clutch engagement state, the ball train 32L receiving the gas pressure begins to move toward the distal end side of the ball guide pipe 31 due to the gas pressure. The movement is transmitted to the ring gear 36 by the balls 32 being engaged with the external teeth 41 of the ring gear 36, the ring gear 36 then rotates in the counterclockwise direction in FIG. 4. In response to this rotation, the pinion gear 17p also rotates in the same direction to thereby rotate the locking base 17 in the belt winding direction.

The rotation of the locking base 17 in the belt winding direction is rotation relative to the spool 13 at the initial stage in the above described relative rotation permissible range. That is, only the locking base 17 rotates in a state where the spool 13 is stopped. This relative rotation of the locking base 17 pivots the locking base pawl 18 radially outward, thereby giving rotation locking of the locking base 17 (in the belt withdrawing direction). The relative rotation of the locking base 17 also gives rotation locking of the spool 13 (in the belt withdrawing direction). In other words, the cam shaft 20 pivots the spool pawl 15 radially inward as a result of receiving the relative rotation of the locking base 17, thereby releasing the rotation lock.

In the meantime, as the rotation of the locking base 17 proceeds to exceed the relative rotation range, the rotation of the locking base 17 is transmitted through the torsion bar 16 to the spool 13, rotating the spool 13 in the belt winding direction to wind the seat belt 2, thus removing slack of the seat belt 2. The amount of rotation by which the spool 13 winds for removing the belt slack depends on the degree of belt slack at that point in time. When the belt slack is removed to give a proper restraining state for occupant restraint, the spool 13 stops the rotation. Then, the gas pressure exerted on the ball train 32L applies proper resistance to the seat belt 2 against belt withdrawal so as to impart tension to the seat belt 2, which gives a proper restraining state to the occupant M, thus increasing restraint of the occupant M.

Note that, according to one embodiment, the ball train 32L is constituted of a predetermined number of balls 32 and is designed to be capable of removing slack of the seat belt 2 using some of the balls 32 of the ball train 32L when the slack of the seat belt 2 is in the normal range at the time of the actuation of the pretensioner 19. In detail, when the slack of the seat belt 2 is in the normal range, removal of the belt slack may be completed before the ball stopper 33 reaches the ring gear 36, that is, a plurality of the balls 32 still remain in the ball guide pipe 31 in front of the ball stopper 33.

Figure 5:
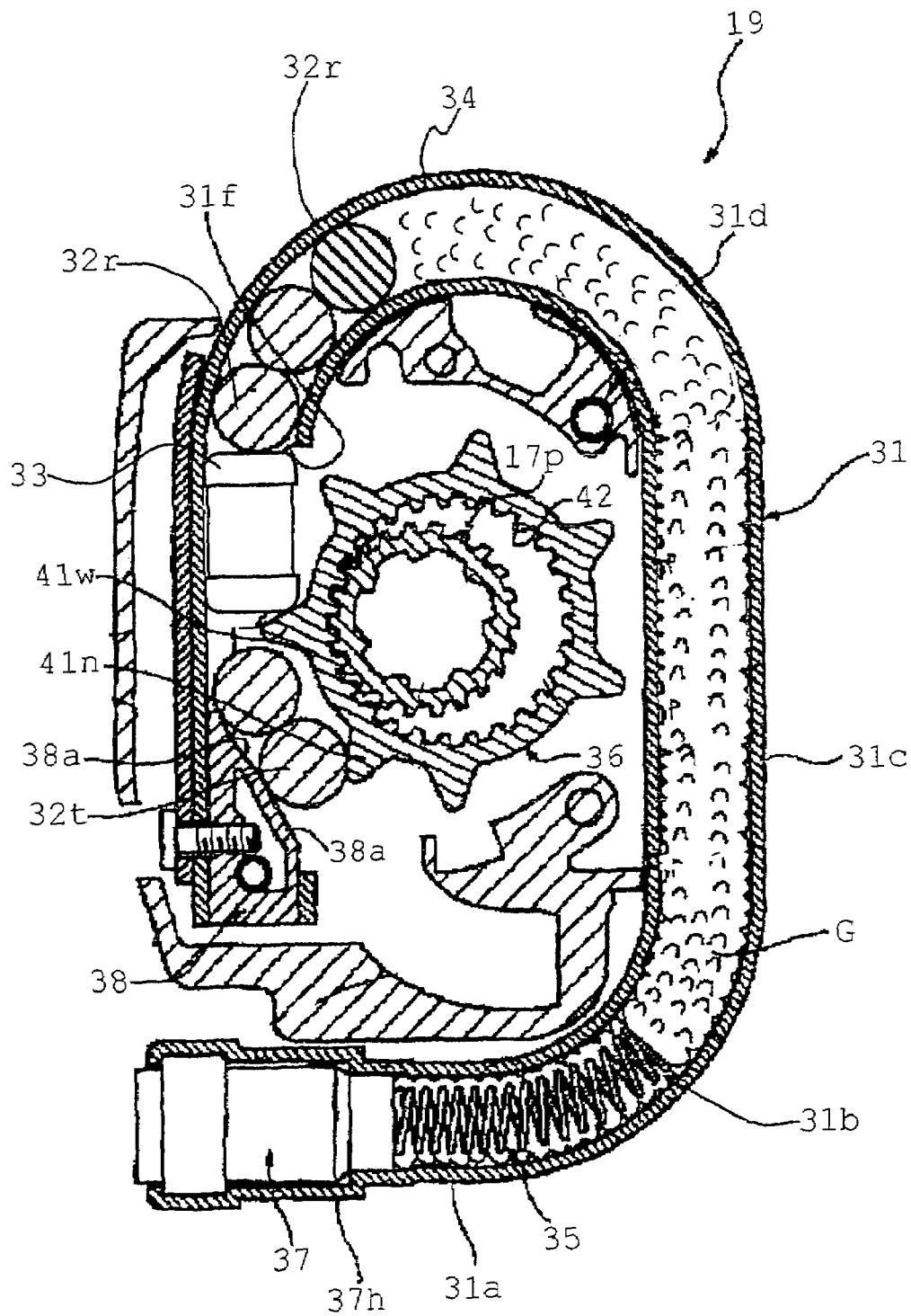
FIG. 5 is a view showing the pretensioner in another state of being actuated, according to one embodiment.

However, there is a possibility that because the occupant M is, for example, wearing thick clothes, slack of the seat belt 2 is beyond the upper limit of the normal range (excessive slack) at the time of the actuation of the pretensioner 19. In such a state, as shown in FIG. 5, the ball stopper 33 may come into contact with the external teeth 41 on the outer periphery of the ring gear 36 before the slack of the seat belt 2 is removed to give a restraining state for occupant restraint. In this state, the ball stopper 33 cannot be caught by the rotation of the ring gear 36 but it is propped, with the result that the ball stopper 33 blocks the movement of the ball train 32L. This makes the residual balls 32r of the ball train 32L stop their movement and remain inside the ball guide pipe 31. These residual balls 32r remaining in the ball guide pipe 31 maintain sufficient gas pressure in the ball guide pipe 31, and the gas pressure may exert proper resistance on the seat belt 2 against belt withdrawal.

Figure 6:
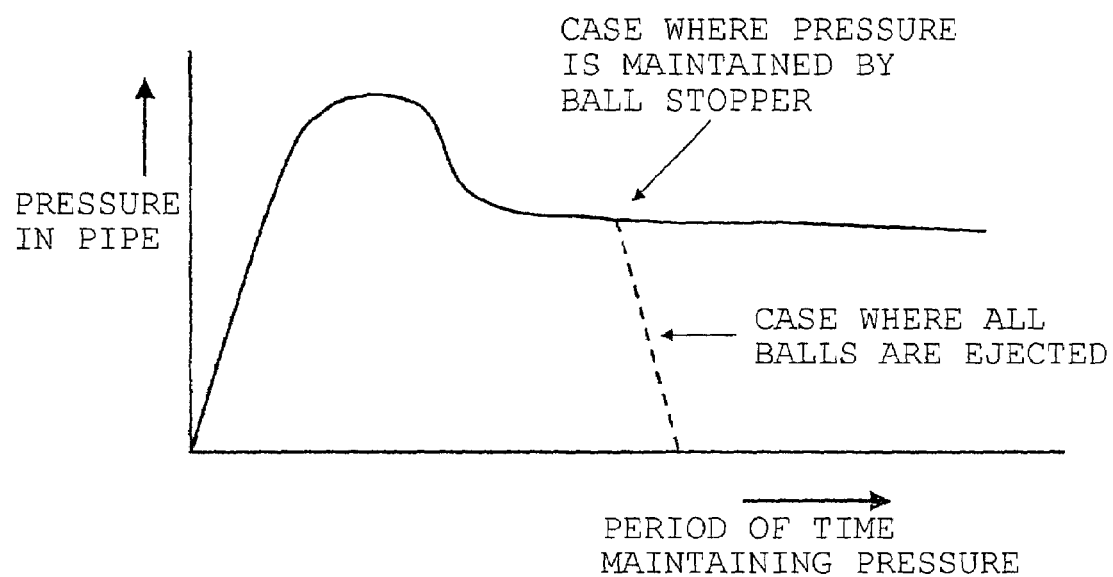
FIG. 6 is a graph showing characteristic of gas pressure in a ball guide pipe, according to one embodiment.

The above described pretensioner 19 may advantageously avoid a situation in which because all the balls 32 in the ball train 32L have been used and ejected from the ball guide pipe 31 due to excessive slack of the seat belt 2 at the actuation of the pretensioner 19, gas pressure in the ball guide pipe 31 is decreased and sufficient tension cannot be imparted to the seat belt 2, and may impart tension to the seat belt 2 for sufficient restraint even with excessive belt slack. In other words, when the seat belt 2 has excessive slack at the time of the restraining operation, the residual balls 32r reliably remain in the ball guide pipe 31 to maintain sufficient gas pressure in the ball guide pipe 31, thus reliably imparting sufficient tension to the seat belt 2. FIG. 6 shows characteristics of gas pressure (inner pressure) in the ball guide pipe 31. FIG. 6 also shows characteristics of gas pressure in the case where all the balls 32 of the ball train 32L are ejected from the ball guide pipe 31 with a dotted line for comparison with the present invention. From the graph, the advantages according to the present invention as described above may be perceived.

The priority application, Japanese Patent Application No. 2006-131034 filed on May 10, 2006 is hereby incorporate by reference herein in its entirety.

While the above description constitutes a preferred embodiment of the present invention, the invention is not limited to the embodiment described above but it may be modified, varied, and changed without departing from its proper scope. The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A seat belt retractor, comprising:
a spool for winding and holding a seat belt thereon; and
a pretensioner including:
a ball guide pipe that aligns a plurality of balls to form a ball train;
a gas generator for generating gas discharged to move the ball train toward a distal end of the ball guide pipe, wherein the spool is rotated in a belt winding direction due to the movement of the ball train to impart tension to the seat belt; and
a ball train movement stopper, for stopping the movement of the ball train in the ball guide pipe, wherein the ball train movement stopper is arranged in the ball train at a position where one or more balls are on a distal side of the ball train movement stopper and one or more residual balls remain on a proximal side of the ball train movement stopper.

2. The seat belt retractor according to claim 1, wherein the ball train movement stopper stops the movement of the ball train before all the balls of the ball train are ejected from the ball guide pipe.

3. The seat belt retractor according to claim 2, wherein the pretensioner includes a motion converting device that converts the movement of the ball train into rotational movement, and wherein the ball train movement stopper includes a ball stopper that is arranged in the ball train so as to be movable in the ball guide pipe and that stops the ball train by contacting a motion converting device.

4. The seat belt retractor according to claim 3, wherein the motion converting device includes a ring gear having on its outer periphery external teeth with which the balls engage in a state where the balls are moving, and wherein the ball stopper is formed to have a shape and size so as to block the movement of the ball train by contacting the outer periphery of the ring gear.

5. The seat belt retractor according to claim 1, wherein the ball train includes at least one residual ball that is configured to maintain gas pressure in the ball guide pipe.

6. The seat belt retractor according to claim 5, wherein the ball train movement stopper is arranged in the ball train at a position where one or more residual balls remain on a proximal side of the ball train.

7. The seat belt retractor according to claim 1, wherein the ball train includes a piston ball arranged to be in contact with a proximal end of the ball train and wherein the piston ball is made of an elastic heat-resistant material in order to seal gas discharged by the gas generator.

8. The seat belt retractor according to claim 1, wherein the ball train movement stopper is shaped like a cylinder with round edges, having a longitudinal length of at least one and half times the diameter of one of the plurality of balls and a width at least equal to the diameter of one of the plurality of balls.

9. The seat belt retractor according to claim 1, further comprising a spiral spring, for continuously exerting a rotational urging force on the spool.

10. The seat belt retractor according to claim 1, further comprising a spool pawl for locking the rotation of the spool to prevent withdrawal of the seat belt.

11. The seat belt retractor according to claim 1, wherein a locking activation mechanism causes a spool pawl to lock the rotation of the spool when an acceleration equal to or larger than a predetermined value occurs.

12. The seat belt retractor according to claim 1, further comprising a torsion bar rotatably connected to the spool and connected to a locking base, wherein the torsion bar is configured to absorb energy generated by the torque on the spool due to withdrawing of the seat belt.

13. The seat belt retractor according to claim 1, wherein the plurality of balls are metal spheres.

14. The seat belt retractor according to claim 1, further comprising a coil spring arranged in the ball guide pipe for applying force on the ball train when the gas generator is ignited.

15. A seat belt device, comprising:
a seat belt;
an anchor for connecting the seat belt to a vehicle body;
a tongue attached to the seatbelt, configured to engage a buckle; and
a seat belt retractor, attached to the seat belt, further comprising:
  a spool for winding and holding a seat belt thereon; and
  a pretensioner including:
    a ball guide pipe that aligns a plurality of balls to form a ball train;
    a gas generator for generating gas discharged to move the ball train toward a distal end of the ball guide pipe, wherein the spool is rotated in a belt winding direction due to the movement of the ball train to impart tension to the seat belt; and
    a ball train movement stopper, for stopping the movement of the ball train in the ball guide pipe, wherein the ball train movement stopper is arranged in the ball train at a position where one or more balls are on a distal side of the ball train movement stopper and one or more residual balls remain on a proximal side of the ball train movement stopper.

16. The seat belt device according to claim 15, wherein the ball train movement stopper stops the movement of the ball train before all the balls of the ball train are ejected from the ball guide pipe.

17. The seat belt device according to claim 16, wherein the pretensioner includes a motion converting device that converts the movement of the ball train into rotational movement, and wherein the ball train movement stopper includes a ball stopper that is arranged in the ball train so as to be movable in the ball guide pipe and that stops the ball train by contacting a motion converting device.

18. The seat belt device according to claim 17, wherein the motion converting device includes a ring gear having on its outer periphery external teeth with which the balls engage in a state where the balls are moving, and wherein the ball stopper is formed to have a shape and size so as to block the movement of the ball train by contacting the outer periphery of the ring gear.

19. The seat belt device according to claim 15, wherein the ball train includes a plurality of residual balls that are configured to maintain gas pressure in the ball guide pipe.

20. The seat belt device according to claim 19, wherein the ball train movement stopper is arranged in the ball train at a position where one or more residual balls remain on a proximal side of the ball train.

21. A seat belt retractor comprising:
a spool for winding and holding a seat belt thereon; and
a pretensioner including:
  a ball guide pipe that aligns a plurality of balls to form a ball train;
  a gas generator for generating gas discharged to move the ball train towards a distal end of the ball guide pipe, wherein the spool is rotated in a belt winding direction due to the movement of the ball train, whereby tension is imparted to the seat belt,
  a piston component being arranged in the ball guide pipe so as to be in contact with a proximal end of the ball train and to transmit pressure of the gas discharged from the gas generator to the ball train;
  a ring gear having on its outer periphery external teeth with which the balls engage in a state where the balls are moving; and
  a ball stopper that is arranged in the ball train so as to be movable in the ball guide pipe and that stops the movement of the ball train in the ball guide pipe by contacting the outer periphery of the ring gear, wherein
at least one residual ball is arranged in the ball guide pipe between the ball stopper and the piston component.

22. The seat belt retractor according to claim 21, wherein the piston component functions as a seal to prevent the discharged gas from leaking beyond the piston component.

23. The seat belt retractor according to claim 22, wherein the ball stopper of the pretensioner stops the movement of the ball train before all the balls of the ball train are ejected from the ball guide pipe in a state where the ball train functions to drive the spool to rotate in the belt winding direction.

24. The seat belt retractor according to claim 23, wherein the at least one residual ball of the pretensioner is arranged to remain in the ball guide pipe between the ball stopper and the piston component in a state where the ball stopper stops the movement of the ball train.

25. The seat belt retractor according to claim 21, wherein the ball stopper is formed into a ball shape or a cylindrical shape, having a longitudinal length of approximately one and a half times to twice the diameter of one of the balls and a width approximately the same as the diameter of the ball.

26. A seat belt device comprising a seat belt retractor according to claim 21.

27. A vehicle comprising a seat belt device according to claim 26.

* * * * *